United States Patent
Kao et al.

(10) Patent No.: US 12,184,180 B2
(45) Date of Patent: Dec. 31, 2024

(54) POWER SUPPLY PHASE DOUBLING SYSTEM

(71) Applicant: ASUSTeK COMPUTER INC., Taipei (TW)

(72) Inventors: Wei Kao, Taipei (TW); Ming-Ting Tsai, Taipei (TW); Hsiang-Jui Hung, Taipei (TW); Hsi-Ho Hsu, Taipei (TW); Chen-Hao Yu, Taipei (TW); Chun-San Lin, Taipei (TW); Wei-Gen Chung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 232 days.

(21) Appl. No.: 17/984,221

(22) Filed: Nov. 9, 2022

(65) Prior Publication Data
US 2023/0336081 A1    Oct. 19, 2023

(30) Foreign Application Priority Data
Apr. 14, 2022 (TW) ................... 111114201

(51) Int. Cl.
*H02M 1/088* (2006.01)
*H02M 1/14* (2006.01)
*H02M 3/158* (2006.01)

(52) U.S. Cl.
CPC ......... *H02M 3/1586* (2021.05); *H02M 1/088* (2013.01); *H02M 1/14* (2013.01)

(58) Field of Classification Search
CPC ....... H02M 3/1586; H02M 1/088; H02M 1/14
See application file for complete search history.

(56) References Cited

U.S. PATENT DOCUMENTS

| | | | | |
|---|---|---|---|---|
| 3,716,802 A | * | 2/1973 | Muratani | ............ H04L 27/2272 331/8 |
| 7,898,310 B2 | | 3/2011 | Qui et al. | |
| 8,558,524 B2 | * | 10/2013 | Carroll | ................ H02M 3/1584 323/272 |
| 8,583,950 B2 | | 11/2013 | Luo et al. | |
| 2021/0265914 A1 | * | 8/2021 | Itou | ...................... H02M 1/0003 |
| 2024/0047965 A1 | * | 2/2024 | Huang | ................. H02H 1/0007 |

FOREIGN PATENT DOCUMENTS

| | | |
|---|---|---|
| CN | 101714869 | 5/2010 |
| CN | 102591438 | 7/2012 |
| CN | 211207287 | 8/2020 |

* cited by examiner

*Primary Examiner* — Adolf D Berhane
(74) *Attorney, Agent, or Firm* — JCIPRNET

(57) ABSTRACT

A power supply phase doubling system includes a pulse width modulation (PWM) controller and first and second phase doubling chips. The PWM controller outputs a PWM signal. The first phase doubling chip is operated at a power supply voltage and has a first PWM output pin to generate a first control signal and a second control signal according to the PWM signal, and generates a first output signal according to the first control signal. The second phase doubling chip is operated at the power supply voltage, has a second PWM output pin, and is configured to generate a second output signal according to the second control signal. The first and second phase doubling chips are respectively switched between a master mode and a slave mode according to a voltage level of the first PWM output pin and a voltage level of the second PWM output pin.

11 Claims, 3 Drawing Sheets

POWER SUPPLY PHASE DOUBLING SYSTEM

CROSS-REFERENCE TO RELATED APPLICATION

This application claims the priority benefit of Taiwan application serial no. 111114201, filed on Apr. 14, 2022. The entirety of the above-mentioned patent application is hereby incorporated by reference herein and made a part of this specification.

BACKGROUND

Technical Field

The disclosure relates to a power supply system and more particularly relates to a power supply phase doubling system adapted to elements on a motherboard.

Description of Related Art

With the progress of a chip manufacturing process and the increase in functions of the resultant chips, power supply requirements for the chips with high power consumption, such as central processing units (CPU), graphics processing units (GPU), and so on, have been gradually increased, and the architecture of multi-phase power supply of a direct current-direct current (DC-DC) converter with a pulse width modulation-based (PWM-based) control mechanism has also been proposed accordingly. Through switching the power supply in turns by different power supply sets (phases) during a cycle, output ripples, operating time, and temperature may be reduced.

In view of the situation that the number of power supply phases exceeds the number of phases supported by a PWM controller chip, two designs of increasing the number of phases are derived, i.e., phase doubling power supply and parallel power supply. However, the design of the phase doubling power supply requires an additional phase doubler between the PWM controller and the driver, so as to double a PWM signal, while the additional element increases the occupied area. By contrast, the design of the parallel power supply results in the same operation of the two sets of power supply phases, which leads to an increase in the number of the output ripples and input ripple current. Besides, the temperature is also increased.

SUMMARY

According to an aspect of this disclosure, a power supply phase doubling system is provided. The power supply phase doubling system includes a PWM controller, a first phase doubling chip, and a second phase doubling chip. The PWM controller is configured to output a PWM signal. The first phase doubling chip is coupled to the PWM controller and operated at a power supply voltage, and the first phase doubling chip has a first PWM output pin, is configured to generate a first control signal and a second control signal according to the PWM signal, and generates a first output signal according to the first control signal. The second phase doubling chip is coupled to the first phase doubling chip and operated at the power supply voltage, and the second phase doubling chip has a second PWM output pin and is configured to generate a second output signal according to the second control signal. The first phase doubling chip and the second phase doubling chip are respectively switched between a master mode and a slave mode according to a voltage level of the first PWM output pin and a voltage level of the second PWM output pin.

In view of the above, compared to the conventional phase doubling power supply, the power supply phase doubling system provided in one or more embodiments of the disclosure requires no phase doubler at the front end of the driver, so as to reduce the area occupied by the power supply phase doubling system on the motherboard. In another aspect, compared to the conventional parallel power supply, the power supply phase doubling system provided in one or more embodiments of the disclosure may separate the on time of two phases, so that the two phases are not switched on synchronously but are switched on alternately while the number of elements stays the same, thereby reducing the number of ripples at output and input ends.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
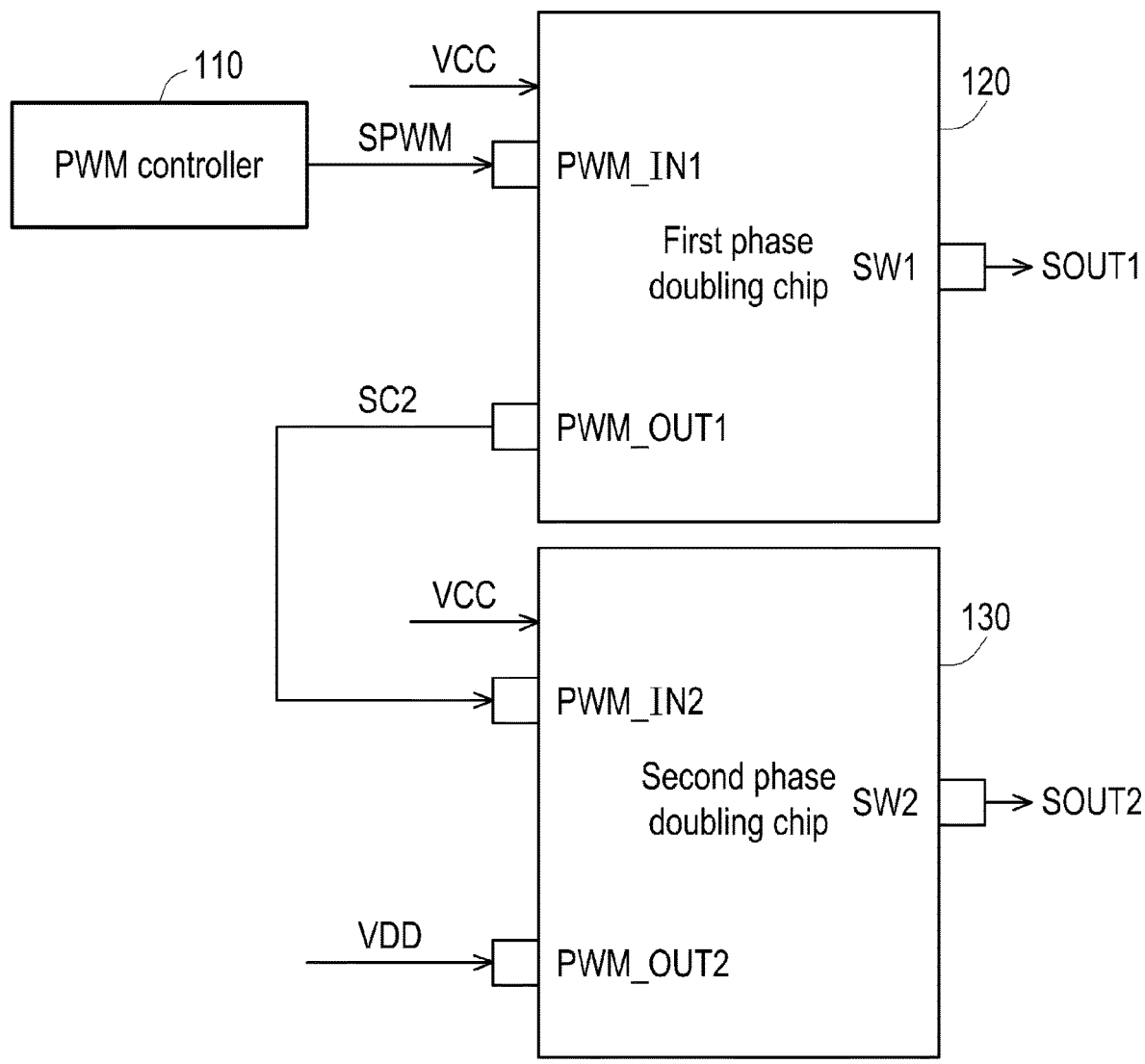
FIG. 1 is a schematic block view of a power supply phase doubling system according to an embodiment of the disclosure.

Reference is now made in detail to exemplary embodiments of the disclosure, and examples of the exemplary embodiments are described in the accompanying drawings. Whenever possible, the same reference numbers are used in the drawings and descriptions to indicate the same or similar parts.

With reference to FIG. 1, a power supply phase doubling system 100 provided in this embodiment supplies power to each element on a motherboard, for instance. The power supply phase doubling system 100 includes a PWM controller 110, a first phase doubling chip 120, and a second phase doubling chip 130.

The PWM controller 110 is configured to output a PWM signal SPWM. For instance, when the PWM controller 110 is in normal operation, a duty cycle of the output PWM signal SPWM may stay at about 5%, and a frequency of the output PWM signal SPWM may be kept at about 600 KHz, which should however not be construed as a limitation in the disclosure.

The first phase doubling chip 120 is coupled to the PWM controller 110. The first phase doubling chip 120 is operated at a power supply voltage VCC and has a first PWM input pin PWM_IN1, a first PWM output pin PWM_OUT1, and a first output pin SW1.

The second phase doubling chip 130 is coupled to the first phase doubling chip 120. The second phase doubling chip 130 is also operated at the power supply voltage VCC and has a second PWM input pin PWM_IN2, a second PWM output pin PWM_OUT2, and a second output pin SW2.

The first phase doubling chip 120 and the second phase doubling chip 130 may be respectively switched between a master mode and a slave mode according to a voltage level of the first PWM output pin PWM_OUT1 and a voltage level of the second PWM output pin PWM_OUT2. Specifically, after the power supply voltage VCC is raised to a predetermined operating voltage (e.g., 3 volts), within a predetermined time interval (e.g., within 30 microseconds), the first phase doubling chip 120 detects the voltage level of the first PWM output pin PWM_OUT1, and the second phase doubling chip 130 detects the voltage level of the second PWM output pin PWM_OUT2. When the voltage level is lower than a threshold, the corresponding phase doubling chip is set to the master mode. When the voltage level is higher than or equal to the threshold, the corresponding phase doubling chip is set to the slave mode.

In this embodiment, as shown in FIG. 1, the first PWM output pin PWM_OUT1 of the first phase doubling chip 120 is coupled to the second PWM input pin PWM_IN2 of the second phase doubling chip 130. At this time, the first PWM output pin PWM_OUT1 may be in a floating state or at a low voltage level, and thus the voltage level of the first PWM output pin PWM_OUT1 is lower than the threshold, and the first phase doubling chip 120 is set to the master mode. On the other hand, the second PWM output pin PWM_OUT2 of the second phase doubling chip 130 receives the set voltage VDD (e.g., 3.3 volts); therefore, the voltage level of the second PWM output pin PWM_OUT2 is higher than or equal to the threshold, and the second phase doubling chip 130 is set to the slave mode.

In this embodiment, the first PWM input pin PWM_IN1 of the first phase doubling chip 120 is coupled to the PWM controller 110 and receives the PWM signal SPWM from the PWM controller 110. The first phase doubling chip 120 in the master mode is configured to generate a first control signal SC1 and a second control signal SC2 according to the PWM signal SPWM. The first phase doubling chip 120 may generate a first output signal SOUT1 according to the first control signal SC1 and output the first output signal SOUT1 from the first output pin SW1. At the same time, the first phase doubling chip 120 may transmit the second control signal SC2 to the second PWM input pin PWM_IN2 of the second phase doubling chip 130 through the first PWM output pin PWM_OUT1.

The second PWM input pin PWM_IN2 of the second phase doubling chip 130 is coupled to the first PWM output pin PWM_OUT1 of the first phase doubling chip 120 and receives the second control signal SC2 from the first PWM output pin PWM_OUT1. The second phase doubling chip 130 in the slave mode is configured to generate a second output signal SOUT2 according to the second control signal SC2 and output the second output signal SOUT2 from the second output pin SW2.

Figure 2:
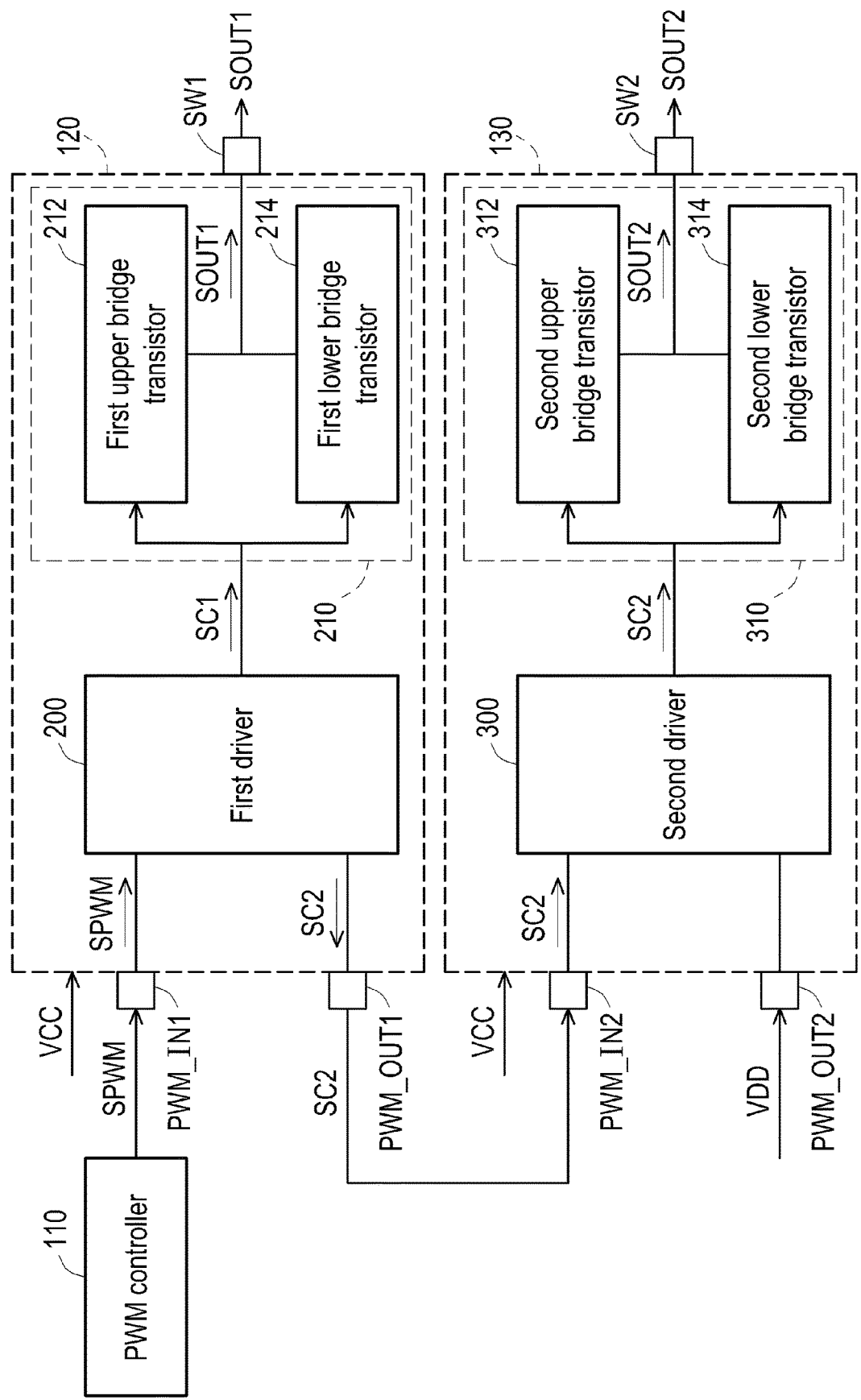
FIG. 2 is a schematic block view of the inside of phase doubling chips according to an embodiment of the disclosure.

The internal structures of the first phase doubling chip 120 and the second phase doubling chip 130 are described below. With reference to FIG. 2, which is a schematic block view of the inside of the phase doubling chips according to an embodiment of the disclosure, the first phase doubling chip 120 provided in this embodiment includes a first driver 200 and a first transistor circuit 210. The first driver 200 is coupled to the first PWM input pin PWM_IN1 and the first PWM output pin PWM_OUT1. The first driver 200 in the master mode may perform the function of a phase divider and, according to the PWM signal SPWM, generate the first control signal SC1 including a first part of the PWM signal SPWM (e.g., odd-numbered pulses) and the second control signal SC2 including a second part of the PWM signal SPWM (e.g., even-numbered pulses) and provide the second control signal SC2 to the first PWM output pin PWM_OUT1.

Figure 3:
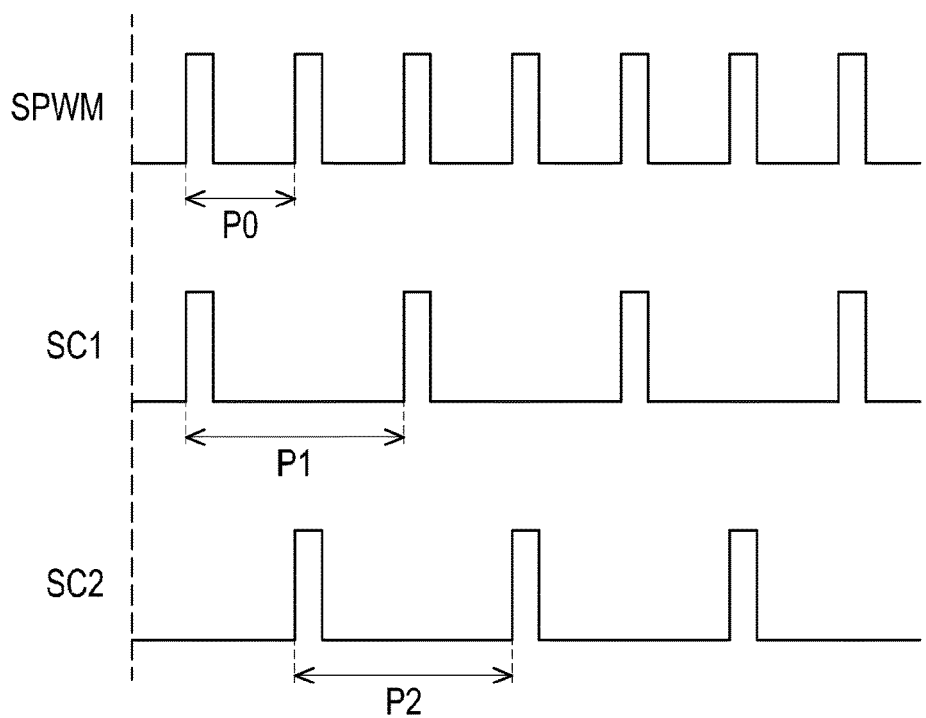
FIG. 3 illustrates a timing diagram of signals of a power supply phase doubling system according to an embodiment of the disclosure.

For instance, FIG. 3 illustrates a timing diagram of the PWM signal SPWM, the first control signal SC1, and the second control signal SC. As shown in FIG. 3, the first control signal SC1 is generated by the first, the third, the fifth, and the seventh pulses (the odd-numbered pulses) of the PWM signal SPWM. The second control signal SC2 is generated by the second, the fourth, and the sixth pulses (the even-numbered pulses) of the PWM signal SPWM. A cycle P1 of the first control signal SC1 is equal to a cycle P2 of the second control signal SC2 and is twice a cycle P0 of the PWM signal SPWM. In other words, the frequency of the PWM signal SPWM is twice the frequency of the first control signal SC1 and the second control signal SC2.

With reference to FIG. 2, the first transistor circuit 210 is coupled to the first driver 200. The first transistor circuit 210 may generate the first output signal SOUT1 according to the first control signal SC1 and transmit the first output signal SOUT1 to the first output pin SW1.

Specifically, the first transistor circuit 210 includes a first upper bridge transistor 212 and a first lower bridge transistor 214. The first upper bridge transistor 212 and the first lower bridge transistor 214 are jointly coupled to the first output pin SW1. A control end of the first upper bridge transistor 212 and a control end of the first lower bridge transistor 214 receive the first control signal SC1. When the first control signal SC1 is at a first logic level (e.g., the high logic level), the first upper bridge transistor 212 is switched on, and the first lower bridge transistor 214 is switched off. When the first control signal SC1 is at a second logic level (e.g., the low logic level), the first upper bridge transistor 212 is switched off, and the first lower bridge transistor 214 is switched on. Thereby, the first transistor circuit 210 may generate the first output signal SOUT1 with the same frequency as that of the first control signal SC1.

The second phase doubling chip 130 includes a second driver 300 and a second transistor circuit 310. The second driver 300 is coupled to the second PWM input pin PWM_IN2 and the second PWM output pin PWM_OUT2. The second driver 300 in the slave mode does not divide the phase of the received second control signal SC2 but directly outputs the second control signal SC2 to the second transistor circuit 310.

The second transistor circuit 310 is coupled to the second driver 300. The second transistor circuit 310 may generate the second output signal SOUT2 according to the second control signal SC2 and transmit the second output signal SOUT2 to the second output pin SW2.

Specifically, the second transistor circuit 310 includes a second upper bridge transistor 312 and a second lower bridge transistor 314. The second upper bridge transistor 312 and the second lower bridge transistor 314 are jointly coupled to the second output pin SW2. A control end of the second upper bridge transistor 312 and a control end of the second lower bridge transistor 314 receive the second control signal SC2. When the second control signal SC2 is at the first logic level (e.g., the high logic level), the second upper bridge transistor 312 is switched on, and the second lower bridge transistor 314 is switched off. When the second control signal SC2 is at the second logic level (e.g., the low logic level), the second upper bridge transistor 312 is switched off, and the second lower bridge transistor 314 is switched on. Thereby, the second transistor circuit 310 may generate the second output signal SOUT2 with the same frequency as that of the second control signal SC2.

In an embodiment of the disclosure, in order to achieve the power saving effect, the PWM controller 110 may allow the PWM signal SPWM to include a middle-level waveform MW having a middle level ML. When the first driver 200 receives the middle-level waveform MW having the middle level ML, the first driver 200 adjusts the first control signal SC1 to the middle level ML, so that the first upper bridge transistor 212 and the first lower bridge transistor 214 are switched off at the same time, and the first driver 200 adjusts the second control signal SC2 to the middle level ML. At this time, the voltage level of the first output signal SOUT1 remains substantially the same.

When the second control signal SC2 is adjusted to the middle level ML, the second driver 300 provides the second control signal SC2 to the second transistor circuit 310, so that the second upper bridge transistor 312 and the second lower bridge transistor 314 are switched off at the same time. At this time, the voltage level of the second output signal SOUT2 remains substantially the same.

Figure 4:
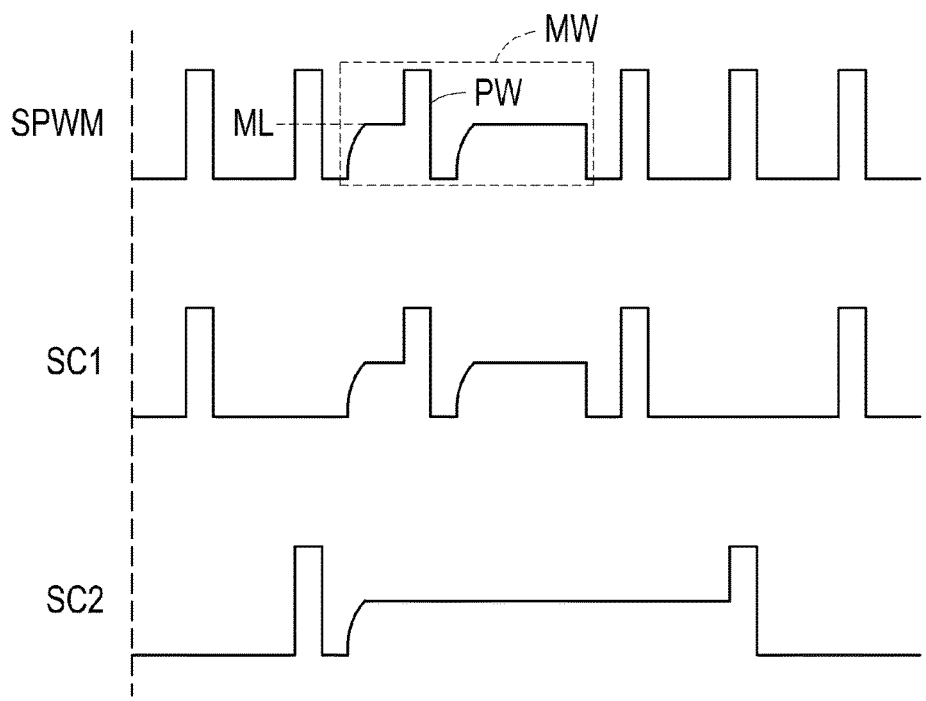
FIG. 4 illustrates a timing diagram of signals of a power supply phase doubling system according to an embodiment of the disclosure.

For instance, FIG. 4 illustrates a timing diagram of the PWM signal SPWM, the first control signal SC1, and the second control signal SC. As shown in FIG. 4, the PWM signal SPWM includes the middle-level waveform MW having the middle level ML. When the PWM signal SPWM is adjusted to the middle level ML, the first control signal SC1 and the second control signal SC2 are also adjusted to the middle level ML.

As shown in FIG. 4, when a pulse waveform PW is inserted into the middle-level waveform MW, the first driver 200 reflects the pulse waveform PW to the first control signal SC1. That is, the first control signal SC1 also includes the corresponding waveform. At the same time, the first driver 200 keeps the second control signal SC2 at the middle level ML. As such, during a period in which the PWM signal SPWM has the middle-level waveform MW, the first phase doubling chip 120 is operated, while the second phase doubling chip 130 remains inoperative, thereby reducing the number of operating phases.

To sum up, compared to the conventional phase doubling power supply design, the power supply phase doubling system provided in one or more embodiments of the disclosure does not require any additional phase doubler at the front end of the driver, so as to reduce the area occupied by the power supply phase doubling system on the motherboard. In another aspect, compared to the design of the conventional parallel power supply, the power supply phase doubling system provided in one or more embodiments of the disclosure may separate the on time of two phases, so that the two phases are not switched on synchronously, thereby reducing the number of the ripples at the output ends and the input ends. In addition, under certain circumstances, the power supply phase doubling system provided in one or more embodiments of the disclosure may ensure the phase doubling chip in the slave mode to be inoperative, thus reducing the number of operating phases and achieving the power saving effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power supply phase doubling system, comprising:
a pulse width modulation controller, configured to output a pulse width modulation signal;
a first phase doubling chip, coupled to the pulse width modulation controller, operated at a power supply voltage and having a first pulse width modulation output pin, configured to generate a first control signal and a second control signal according to the pulse width modulation signal, and generating a first output signal according to the first control signal; and
a second phase doubling chip, coupled to the first phase doubling chip, operated at the power supply voltage and having a second pulse width modulation output pin, and configured to generate a second output signal according to the second control signal,
wherein the first phase doubling chip and the second phase doubling chip are respectively switched between a master mode and a slave mode according to a voltage level of the first pulse width modulation output pin and a voltage level of the second pulse width modulation output pin.

2. The power supply phase doubling system according to claim 1, wherein when the power supply voltage is raised to an operating voltage, the first phase doubling chip and the second phase doubling chip detect the voltage level of the first pulse width modulation output pin and the voltage level of the second pulse width modulation output pin within a time interval, respectively, when the voltage level is lower than a threshold, the corresponding phase doubling chip is set to the master mode, and when the voltage level is higher than or equal to the threshold, the corresponding phase doubling chip is set to the slave mode.

3. The power supply phase doubling system according to claim 1, wherein the first phase doubling chip further has a first pulse width modulation input pin coupled to the pulse width modulation controller and receiving the pulse width modulation signal from the pulse width modulation controller,
the second phase doubling chip further has a second pulse width modulation input pin coupled to the first pulse width modulation output pin of the first phase doubling chip and receiving the second control signal from the first pulse width modulation output pin, and the second pulse width modulation output pin of the second phase doubling chip receive a set voltage.

4. The power supply phase doubling system according to claim 3, wherein the first phase doubling chip further has a first output pin to output the first output signal, and
the second phase doubling chip further has a second output pin to output the second output signal.

5. The power supply phase doubling system according to claim 4, wherein the first phase doubling chip is set to the master mode, and the first phase doubling chip comprises:
a first driver, coupled to the first pulse width modulation input pin and the first pulse width modulation output pin, wherein the first driver in the master mode generates the first control signal comprising a first part of the pulse width modulation signal and the second control signal comprising a second part of the pulse width modulation signal according to the pulse width modulation signal and provides the second control signal to the first pulse width modulation output pin; and a first transistor circuit, coupled to the first driver, generating the first output signal according to the first control signal, and transmitting the first output signal to the first output pin.

6. The power supply phase doubling system according to claim 5, wherein the first transistor circuit comprises a first upper bridge transistor and a first lower bridge transistor, the first upper bridge transistor and the first lower bridge transistor are jointly coupled to the first output pin, a control end of the first upper bridge transistor and a control end of the first lower bridge transistor receive the first control signal, when the first control signal is at a first logic level, the first upper bridge transistor is switched on, and the first lower bridge transistor is switched off, and when the first control signal is at a second logic level, the first upper bridge transistor is switched off, and the first lower bridge transistor is switched on.

7. The power supply phase doubling system according to claim 6, wherein the pulse width modulation signal received by the first driver comprises a middle-level waveform having a middle level, when the first driver receives the middle-level waveform having the middle level, the first driver adjusts the first control signal to the middle level, so that the first upper bridge transistor and the first lower bridge transistor are switched off at the same time, and the first driver adjusts the second control signal to the middle level.

8. The power supply phase doubling system according to claim 7, wherein when a pulse waveform is inserted into the middle-level waveform, the first driver reflects the pulse waveform to the first control signal and keeps the second control signal at the middle level.

9. The power supply phase doubling system according to claim 4, wherein the second phase doubling chip is set to the slave mode, and the second phase doubling chip comprises:
a second driver, coupled to the second pulse width modulation input pin and the second pulse width modulation output pin and outputting the received second control signal in the slave mode; and
a second transistor circuit, coupled to the second driver, generating the second output signal according to the second control signal, and transmitting the second output signal to the second output pin.

10. The power supply phase doubling system according to claim 9, wherein the second transistor circuit comprises a second upper bridge transistor and a second lower bridge transistor, the second upper bridge transistor and the second lower bridge transistor are jointly coupled to the second output pin, a control end of the second upper bridge transistor and a control end of the second lower bridge transistor receive the second control signal, when the second control signal is at a first logic level, the second upper bridge transistor is switched on, and the second lower bridge transistor is switched off, and when the second control signal is at a second logic level, the second upper bridge transistor is switched off, and the second lower bridge transistor is switched on.

11. The power supply phase doubling system according to claim 10, wherein when the second control signal is adjusted to a middle level, the second driver provides the second control signal to the second transistor circuit, so that the second upper bridge transistor and the second lower bridge transistor are switched off at the same time.

\* \* \* \* \*